| United States Patent [19] | [11] Patent Number: 4,857,395 |
|---|---|
| Benton et al. | [45] Date of Patent: Aug. 15, 1989 |

[54] GRAPHITE COMPOSITES AND PROCESS FOR THE MANUFACTURE THEREOF

[75] Inventors: Kenneth C. Benton, Macedonia; David A. Pierman, Cleveland; Joseph R. Fox, Solon, all of Ohio

[73] Assignee: The Standard Oil Company, Cleveland, Ohio

[21] Appl. No.: 106,642

[22] Filed: Oct. 8, 1987

[51] Int. Cl.$^4$ ............................ B05D 3/02; B32B 9/00
[52] U.S. Cl. ................................. 428/306.6; 428/408; 428/698; 428/312.6
[58] Field of Search ............ 428/408, 698, 699, 306.6, 428/307.3, 312.6, 312.8; 427/226–229

[56] References Cited

U.S. PATENT DOCUMENTS

| 1,483,507 | 2/1924 | Brockbank . | |
|---|---|---|---|
| 2,013,625 | 9/1935 | Buck | 106/9 |
| 3,140,190 | 7/1964 | DiLazzaro | 106/56 |
| 3,264,222 | 8/1966 | Carpenter et al. | 252/301.1 |
| 4,460,638 | 7/1984 | Haluska | 428/408 X |
| 4,460,639 | 7/1984 | Chi et al. | 428/408 X |
| 4,460,640 | 7/1984 | Chi et al. | 428/408 X |
| 4,539,301 | 9/1985 | Kaneko et al. | 501/99 |
| 4,559,270 | 12/1985 | Sara | 428/408 |
| 4,567,103 | 1/1986 | Sara | 428/408 |
| 4,610,917 | 9/1986 | Yamamura et al. | 428/408 X |
| 4,618,529 | 10/1986 | Yamamura et al. | 428/408 X |
| 4,661,409 | 4/1987 | Kieser et al. | 428/408 |
| 4,692,367 | 9/1987 | Richter | 428/408 X |

FOREIGN PATENT DOCUMENTS 0125249 7/1985 Japan .

*Primary Examiner*—Nancy A. B. Swisher
*Attorney, Agent, or Firm*—Larry W. Evans; Joseph G. Curatolo; Sue E. Phillips

[57] ABSTRACT

Graphite composite articles comprising a graphite structure formed from a porous graphite material and an impregnant selected from the group consisting of glass precursors and ceramic precursors, filling the pores and coating the surface of the structure. The present invention also provides a process for the manufacture of graphite composites comprising the steps of infiltrating a porous graphite structure with a material selected from the group consisting of glass precursors and ceramic precursors and subsequently converting the precursor to a glass or a ceramic respectively.

18 Claims, No Drawings

GRAPHITE COMPOSITES AND PROCESS FOR THE MANUFACTURE THEREOF

TECHNICAL FIELD

The present invention provides graphite composite materials. The composites are useful for the manufacture of equipment for the chemical processing industry, such as heat exchangers, and for molten metals processing. A process for impregnation of porous graphite structures with compositions that can be subsequently converted to inorganic oxides and/or carbides and produce graphite/glass or graphite/ceramic composites is also provided.

BACKGROUND ART

Graphite offers several advantages as a material of construction for equipment used in difficult environments. In particular, graphite has an excellent heat transfer coefficient and exhibits excellent thermal stability in non-oxidizing environments. However, graphite is porous, and, when used for the construction of heat exchangers, the pores must be filled to prevent cross-contamination of the liquid streams. Presently, porous graphite tubes and blocks used for heat exchanger applications are impregnated with thermoset resins of the phenolformaldehyde or furan-formaldehyde type. This is accomplished by forcing the oligomeric resin into the graphite pores under pressure, and heating to cure. Three to four cycles are required to obtain a product which does not show permeation in five minutes under 115 psi (0.79 MPa), a quality control test.

In addition to sealing the pores, the resin impregnants provide useful improvements in the strength of the graphite. However, the use of the organic resin impregnants limits the service temperature of impervious graphite heat exchangers to less than 177° C. Although it is possible to impregnate graphite heat exchangers with a fluorocarbon resin to provide service temperatures of up to 232° C., still higher operating temperatures are considered desirable.

Composite materials comprising graphite and silicon carbide have been known for many years. U.S. Pat. No. 1,483,507 is directed toward such articles and a method for their manufacture. The latter calls for the incorporation of silicon and graphite and an inert refractory with an adhesive. A molded article thereof is heated to volatilize and diffuse the silicon into the pores of the graphite. It is next immersed in caustic soda to form a silicate which, when subsequently heated, exudes to the surface and forms a glaze.

U.S. Pat. No. 2,013,625 is also directed toward refractory articles which can comprise graphite and certain metallic substances such as metal, metal alloys and metalloids. When the article is heated, the metallic substances present at the surface are oxidized to form molten and viscous glass which provides a protective coating. The metallic substance can be distributed throughout the material from which the article is manufactured or by concentrating it at the surface such as by painting or spraying an oil suspension of the material onto the article or mold in which the article is made.

U.S. Pat. No. 3,264,222 is directed toward a method of manufacturing refractory products of amorphous carbon or graphite. The latter material is mixed with a refractory metal-containing material such as zirconium hydride. The mixture is compressed under high pressure and rapidly heated to about 2000° C. to melt the zirconium and cause it to flow into the pores of the graphite. Continued heating carburizes the zirconium.

U.S. Pat. No. 3,140,190 provides a method of making ceramic refractory compositions having a graphite base. Powdered graphite is blended with a ceramic additive and a liquid carbonaceous binder. The blend is then compressed and shaped and heat treated to resinify the binder and then graphitize it. The ceramic additives include molybdenum disilicide and titanium diboride which form glassy ceramic protective coatings.

Finally, U.S. Pat. No. 4,539,301 discloses thin, flaky graphite-containing refractories useful as lining materials for steel making furnaces. The material is obtained by refining and purifying a naturally occurring flaky graphite to obtain a specific thickness and flat surface layer size. These graphites are then conventionally mixed with known refractory materials to form refractory articles under pressure and heat.

As can be seen, generally each of the patents provides for the mixing of the graphite and ceramic material together to form an article by heating to high temperatures. While U.S. Pat. No. 2,013,625 allows for the ceramic or glassy material to be applied to the surface of the graphite article, the materials employed do not fill the pores of the graphite totally, but only at the surface. Thus, the art has not recognized heretofore a relatively simple process whereby a porous graphite structure can be impregnated with a glass precursor dispersion or solution which forms glasses at relatively moderate conditions.

SUMMARY OF THE INVENTION

It is therefore an object of the present invention to provide impervious graphite composites that are stable at temperatures in excess of 232° C.

It is another object of the present invention to provide graphite composites that are resistant to oxidizing conditions.

It is yet another object of the present invention to provide graphite composites that can be utilized in the chemical processing industry and in particular as heat exchangers.

It is a further object of the present invention to provide graphite composites suitable as equipment for processing of molten metals.

More particularly, it is an object of the present invention to provide graphite composite articles comprising a graphite structure formed from a porous graphite material and an impregnant selected from the group consisting of glass precursors and ceramic precursors, filling the pores and coating the surface of said structure.

It is yet another object of the present invention to provide a process for the manufacture of the foregoing graphite composites.

More particularly, it is an object of the present invention to provide a process for the manufacture of graphite composites comprising the steps of infiltrating a porous graphite structure with a material selected from the group consisting of glass precursors and ceramic precursors and subsequently converting the precursor to a glass or a ceramic respectively.

These and other objects, together with the advantages thereof over known graphite composites, which shall become apparent from the specification which follows, are accomplished by the invention as hereinafter described and claimed.

PREFERRED MODE FOR CARRYING OUT THE INVENTION

As previously stated, the composites of the present invention comprise porous graphite structures and a glass or ceramic material. Suitable materials include inorganic oxides, carbides, nitrides and borides such as the oxides of silicon, aluminum, zirconium, and titanium; mixed oxides, such as silicon/aluminum, silicon/titanium, silicon/boron, silicon/cerium, silicon/hafnium, silicon/zirconium, silicon/boron/aluminum, silicon/aluminum/zinc, silicon/zirconium/yttrium; titanium carbide, titanium diboride; and aluminum nitride. Others are more broadly set forth hereinbelow.

The composites can be prepared by several different methods. As one example, the glass or ceramic powder can be mixed with the graphite and a binder in an aqueous slurry, which is then slip-cast and sintered in a typical ceramic fabrication process. For a second example, the glass or ceramic powder can be dispersed in a fluid medium and applied to the prefabricated graphite article by spraying or immersion coating, followed by removal of the fluid carrier.

A third and preferred process is the process of the present invention. It can be practiced by infiltrating the fabricated graphite article with a solution or dispersion of a precursor of the desired glass or ceramic composition, and subsequently converting the precursor to a glass or ceramic by the application of heat and/or chemical agents. The infiltration may be performed under pressure, or under the influence of an electric field, and the process of infiltration and conversion may be repeated several times, until the desired level of the inorganic constituent is obtained.

Precursor solutions or dispersions which are suitable for use in the latter method are those obtained by the hydrolysis and condensation of the alkoxides, alkyls, alkylalkoxides, halides, acetates or other hydrolyzable compounds of the elements of Groups IA (sodium family) through VIIA (manganese family); Groups IB (copper family) through VB (nitrogen family) and Group VIII of the Periodic Table of the Elements, and the rare earth elements of atomic number 58 through 71, and preferably, such hydrolyzable compounds of the elements of Groups IIIA (scandium family) through VIA (chromium family) and Groups IB through IVB (carbon family). Particularly useful elements of the glass and ceramic precursors are the hydrolyzable compounds of boron, aluminum, silicon, tin, zinc, titanium, zirconium, hafnium, niobium, tantalum, molybdenum, tungsten, and the rare earth (lanthanide) elements.

Preferred precursor compounds include tetraalkoxysilanes, alkyltrialkoxysilanes, dialkyldialkoxysilanes, trialkoxyboron and trialkoxyaluminum compounds, tetraalkyl-stannates, -titanates and -zirconates, halides of niobium, hafnium, and tungsten, and the rare earth acetates. Some examples include tetraethoxysilane (TEOS), tetramethoxysilane (TMOS), methyltrimethoxysilane (MTMS), ethyltriethoxysilane (ETOS), phenyltriethoxysilane (PTES), dimethyldimethoxysilane, 3-aminopropyltriethoxysilane (3-APTES), trimethylborate, tri-s-butoxyaluminum, tetraethylstannate, tetra-i-propyltitanate, tetraethylzirconate, hafnium tetrachloride and cerium acetate.

Many of the foregoing glass precursors are silica sol compositions which have been described in detail in a copending application, U.S. Ser. No. 090,575 owned by the Assignee of record herein. The application discloses a variety of sol compositions as well as a process for their preparation, the subject matter of which is accordingly incorporated by reference. Preferably the precursor comprises between about 50 and 100 weight percent of one or more alkoxysilanes. The precursor can also contain one or more non-alkoxysilanes as described in the preceding paragraphs in amounts ranging between 50 and 100 weight percent; that is, in mixtures with and without alkoxysilanes.

The precursor solutions or dispersions are prepared by controlled hydrolysis, usually in an organic medium which is a co-solvent for both the hydrolyzable inorganic compound and water. Such solvents include alcohols, glycols, glycol ethers, cyclic ethers and the like. Alcoholic solutions are preferred inasmuch as alcohols can wet the graphite structure more readily than water which is an important factor for pore infiltration. Typical examples of suitable solvents include methanol, ethanol, 2-propanol, ethylene glycol, ethylene glycol monomethyl ether, and tetrahydrofuran. The concentration of the glass or ceramic precursor in the solvent is preferably as high as possible, commensurate with a reasonable shelf life and a usable viscosity for the precursor solution or dispersion. Shelf life is greatest for the alkoxysilanes and therefore, these are preferred precursor compounds or, as noted previously, they should comprise at least 50 weight percent of the total precursor. The concentration may range from 5 to 25 weight/volume percent, calculated as the equivalent metal oxide.

The amount of water used in the preparation of the precursor solution or dispersion, referred to herein as the sol, is dependent upon the particular hydrolyzable compound employed, and, on a molar basis, may be less than, equal to, or greater than the moles of hydrolyzable groups present in the precursor compounds. Preferably, the ratio of the moles of water to moles of hydrolyzable groups falls in the range of 0.25 to 4.0. The water may be all introduced at the beginning of the reaction, or a portion may be added at a later stage. The amount of alcohol ranges from about 1 to 50 volume percent.

The preparation of the sol may be optionally catalyzed by acids or bases. Suitable acid catalysts include mineral acids and organic acids, such as hydrochloric acid, sulfuric acid, nitric acid, acetic acid, and the like. Suitable base catalysts include the alkali and alkaline earth metal hydroxides, ammonium hydroxide and amines, such as sodium hydroxide, calcium hydroxide, trimethylamine and the like. Different catalysts may be used for the two different stages, that is, hydrolysis and condensation.

The temperature at which the sol preparation is performed is dependent upon the reactivity of the particular alkoxide to be used. Thus, in the case of a titanium alkoxide, the reaction may be performed at about 20° to 30° C., while 50° to 70° C. is preferred in the case of an alkoxysilane.

The precursor compounds may be used alone or in combination, to produce solutions or dispersions containing one or several metal or metalloid elements. For example, a precursor solution may be prepared from tetraethoxysilane, a mixture of tetraethoxysilane with methyltrimethoxysilane, or a mixture composed of tetraethoxysilane, trimethylborate and tri-s-butoxyaluminum. When preparing precursor solutions containing only silicon as the metalloid element, it is preferred to use a mixture of a tetraalkoxysilane with an alkyltrialkoxysilane, as solutions prepared from the mixed alkoxysilanes are more stable than those prepared from a single alkoxysilane, which tend to gel rapidly, especially when prepared to high (>15 wt.%) equivalent metal oxide concentrations.

In the instance where the sol is to consist of two or more components, it is preferred that the least reactive component be allowed to hydrolyze partially and condense before the more reactive components are introduced. Thus, for example, in the preparation of a silicon-titanium sol, the less-reactive silicon alkoxides are allowed to react partially before the introduction of the more-reactive titanium alkoxides. The two stages of the reaction may be performed at different temperatures.

Hydrolysis of the precursor compound or compounds is important to build a condensed network. Otherwise, the precursors can volatilize during heating stages which results in low pore filling and thin layer surface coating. The ability to fill as many pores as possible is an important factor in creating graphite composites of low permeability. Thus, it is equally important that a high content of precursor be made available to the graphite pore structure.

The sol may be infiltrated into the graphite structure by immersing the graphite article in the sol and, optionally, applying a pressure of one to fifty atmospheres (0.1 to 5 MPa). Where the sols have high viscosity, it may be desirable first to apply a vacuum of about 400 to about 750 mm of mercury before introducing the sol; in these cases, infiltration pressures of four to ten atmospheres (0.25 to 1 MPa) are preferred. The infiltration may be performed at ambient, sub-ambient or super-ambient temperature, but is preferably performed in the range of 0° to 90° C., and most preferably in the range of 20° to 65° C. The time required for the infiltration is not critical, and the article may be subjected to the infiltration conditions for any convenient time, usually for from one to several hours.

Alternatively, the sol may be synthesized with charged functionalities to permit infiltration into the graphite structure under the influence of an electric field, referred to herein as electroinfiltration. The infiltration stage may require from one to several hours, under potentials of 5 v to 100 v D.C. A wide variety of electroinfiltration procedures are possible; further details are provided in the examples appearing hereinbelow.

Following the infiltration step, the sol is converted to a gel and ultimately to the glass or ceramic. The conversion to the gel stage may be accomplished by the removal of the solvent, for example, by heating the solinfiltrated article, optionally under reduced pressure, referred to hereinbelow as drying. Alternatively, the porous graphite may be pretreated with a chemical gelling agent prior to immersion in the sol; such gelling agents include, for example, ammonia or an amine.

After the infiltrating and drying stages, the article is heat-treated in order to produce further condensation, eliminate organic groups and convert the infiltrated material to a glass or ceramic. The heat treatment may be performed over a broad temperature range, for example, from 200° to 2000° C., optionally under an inert atmosphere. Preferably, the infiltrated article is heated at greater than 400° C. to ensure removal of the organic functions.

Generally, the maximum heat-treating temperature will be determined by the type of product desired, and will be of the order of 800° to 1100° C. for a graphite/glass composite and as high as 1800° C. for a graphite/ceramic composite. Heat treatments at temperatures higher than about 600° C. are preferably performed under an inert atmosphere in order to minimize damage to the graphite. However, the use of an oxidizing atmosphere in combination with an appropriate heating schedule can ensure the formation of a carbon-free glass, while the glass usually contains some carbon when the heating is performed under an inert atmosphere. The infiltration, drying and heat treatment may be repeated several times, until the desired level of inorganic impregnant is obtained.

In order to demonstrate practice of the present invention, several different sol formulations were prepared and used to impregnate graphite articles as described in the following examples. Where a graphite tube has been reported, the dimensions thereof were approximately 32 mm O.D. × 19 mm I.D. × 100 mm long. All formulations are in parts by volume per 100 parts of total inorganic alkoxide, unless otherwise noted.

EXAMPLE NO. 1

A sol of tetraethoxysilane was employed to impregnate a graphite block. The sol was applied under pressure in two separate treatments each separately fired.

Part 1A

Two 207 ml crown cap bottles were each charged with 2.4 parts absolute ethanol, 100 parts tetraethoxysilane (TEOS), 32.1 parts water and 0.2 parts 1N hydrochloric acid. The bottles were capped and agitated in a constant temperature bath at 60° C. The resulting sols were allowed to cool to ambient temperature and combined. The sols contained 20 weight/volume percent silica equivalent.

Part 1B

A graphite sample approximately 25 mm × 50 mm × 6.5 mm was placed in a 600 ml pressure reactor, and a vacuum of approximately 660 mm Hg was applied for 16 hours. Sol 1A was transferred to the reactor under pressure from a sample cylinder. A pressure of 120 psig (0.83 MPa) was then applied to the reactor for 8 hours at ambient room temperature of about 21° C. The pressure was released and the graphite sample was dried at 75° C. under a pressure of approximately 100 mm Hg for 16 hours. The dried sample was then fired under a nitrogen stream by heating from ambient temperature to 750° C. in 1 hours, held for 1 hour at 750° C., and allowed to cool in the furnace for about 6 hours prior to removal.

The sample was returned to the pressure reactor, and the infiltration, drying and firing steps were repeated. The silica incorporation was 4.0 weight percent silica. X-ray dot mapping of the silicon suggested that the silica was evenly distributed throughout the cross-section of the sample.

EXAMPLE NO. 2

A sol of tetraethoxysilane and methyltrimethoxysilane was employed to impregnate a graphite tube. The sol was applied under pressure in one coating.

Part 2A

Sol 2A was prepared by combining absolute ethanol, 17.0 parts; TEOS 44.4 parts, methyltrimethoxysilane (MTMS), 55.6 parts; water, 61.1 parts; and 1N hydrochloric acid, 0.36 parts and heating for 1 hour at 60° C.

under mild agitation. The sol contained 20 weight-/volume percent silica equivalent.

Part 2B

A graphite tube described hereinabove was sealed in a pressure reactor and a vacuum of approximately 660 mm Hg was applied for 16 hours at ambient temperature. Sol 2A was pressure-transferred into the reactor from a sample cylinder, and the reactor was pressurized to 100 psig (0.69 MPa) with argon. After 4 hours at ambient temperature, the pressure was released, and the tube was dried for approximately 16 hours at 75° C. under a reduced pressure of approximately 100 mm Hg. The tube was then heated under nitrogen to 750° C. in 1 hour, held for 1 hour at 750° C., and allowed to cool for 6 hours in the furnace. The resulting silica incorporation was about 2 weight percent.

EXAMPLE NO. 3

A sol of tetraethoxysilane and methyltrimethoxysilane was employed to impregnate a graphite tube. The sol was applied under pressure in six treatments.

Part 3A

Sol 3A was prepared by heating 29.8 parts absolute ethanol, 61.0 parts TEOS, 39.0 parts MTMS; 34.3 parts water and 0.25 parts 1N hydrochloric acid for 1 hour at 60° C. under mild agitation.

Part 3B

A graphite tube was treated with sol 3A in the same manner as described in Example No. 2, Part 2B, except that the infiltration, drying and firing steps were performed a total of six times. The silica incorporation was about 7.5 weight percent. When tested for permeability, the tube passed at 40 psi (0.28 MPa), and exhibited only very slight permeability at 60 psi (0.41 MPa). Mercury porosimetry of a sample cut from the tube indicated a total pore volume of 0.08 cc/gm compared with a total pore volume of 0.17 cc/gm for a similar sample cut from an untreated tube.

EXAMPLE NO. 4

A sol of tetraethoxysilane and methyltrimethoxysilane was employed to impregnate a graphite tube. The sol was applied under pressure in seven treatments.

Part 4A

Sol 4A was identical to sol 3A.

Part 4B

A graphite tube described hereinabove was sealed in a pressure reactor, and a vacuum of approximately 660 mm Hg was applied for 2 hours at ambient temperature. Sol 4A was then pressure-transferred into the reactor from a sample cylinder. The reactor was pressurized to 100 psig (0.69 MPa) with argon. After 4 hours at ambient temperature, the pressure was released. The tube was dried at 75° C. under a reduced pressure of about 100 mm Hg for 16 hours. The infiltration and drying steps were repeated twice, after which the tube was heated to 750° C. in 1 hour under flowing nitrogen, held for 1 hour at 750° C., and allowed to cool in the furnace for about 6 hours.

The infiltration and drying cycles were repeated three additional times, with a firing after the third cycle. Finally, a single infiltration/drying/firing cycle was performed. The sample was subjected to a total of seven infiltration and drying cycles, with a firing after the third, sixth and seventh. The silica incorporation was about 9.9 weight percent based on the weight of the original, untreated tube.

EXAMPLE NO. 5

A sol of tetraethoxysilane and methyltrimethoxysilane was employed to impregnate a graphite tube. The sol was applied under pressure in nine treatments.

Part 5A

Sol 5A was identical to sol 3A.

Part 5B

A graphite tube described hereinabove was sealed in a pressure reactor. Sol 5A was pressure-transferred into the reactor from a sample cylinder, and a pressure of 100 psig (0.69 MPa) of argon was applied. After 4 hours at ambient temperature, the pressure was released and the tube was dried for 3 hours at 75° C. under a reduced pressure of about 100 mm Hg. The tube was then heated under flowing nitrogen from ambient temperature to 585° C. in 1 hour, held for 1 hour at 585° C. and allowed to cool overnight in the furnace. The process was repeated until a total of nine infiltration/drying/firing cycles had been performed. The total silica incorporated into the porous graphite was 12.6 weight percent, based on the weight of the original untreated tube.

EXAMPLE NO. 6

A sol of methyltrimethoxysilane was employed to impregnate a graphite tube. The sol was applied under pressure in one treatment.

Part 6A

Sol 6A was prepared by combining 2.6 parts absolute ethanol, 100 parts MTMS, 37.7 parts water and 0.28 parts 1N hydrochloric acid, and heating for 1 hour at 60° C. under mild agitation. The sol contained 30 weight/volume percent silica equivalent.

Part 6B

A graphite tube described hereinabove was treated with sol 6A in the manner described in Example 2, Part 2B. The resulting silica incorporation was 3.9 weight percent silica, compared with the 2 percent silica incorporation obtained in Example No. 2 using the 20 weight/volume percent silica equivalent sol, which illustrates the advantage of using a highly concentrated sol.

EXAMPLE NO. 7

A sol of tetramethoxysilane was employed to impregnate a graphite tube. The sol was applied under pressure in one treatment.

Part 7A

Sol 7A was prepared by combining 14.1 parts absolute ethanol, 100 parts tetramethoxysilane (TMOS), 48.5 parts water and 0.33 parts 1N hydrochloric acid, and heating for 1 hour at 60° C. under mild agitation. The sol contained 25 weight/volume percent silica equivalent.

Part 7B

A graphite tube was treated with Sol 7A in the same manner as described in Example 2, Part 2B. The silica incorporation was 3.25 weight percent.

EXAMPLE NO. 8

A sol of tetraethoxysilane and methyltrimethoxysilane was employed to impregnate a graphite tube. The sol was applied under pressure in one treatment.

Part 8A

A 500 ml 3-neck, round bottom flask, fitted with a reflux condenser, thermometer, magnetic spin bar for agitation and heating mantle, was charged with 200 parts absolute ethanol, 61 parts TEOS, 39 parts MTMS, 9.9 parts water, and 0.42 parts 1N hydrochloric acid. The reaction mixture was heated for 1.5 hours at 60° C. under mild agitation. To the flask were then added 24.6 parts water and 0.5 part N ammonium hydroxide, and heating was continued for 1.5 hours at 60° C. The resulting Sol 8A had a pH of 8.

Part 8B

A graphite tube was treated with Sol 8A in the manner described in Example No. 2, Part 2B. The silica incorporation was 0.8 weight percent.

EXAMPLE 9

A sol of tetraethoxysilane and methyltrimethoxysilane was employed to impregnate a graphite tube. The sol was applied under reduced pressure in one treatment.

Part 9A

Sol 9A was identical to Sol 3A.

Part 9B

A graphite tube described hereinabove was immersed in Sol 9A for 4 hours, dried for 16 hours at 75° C. under a reduced pressure of about 100 mm Kg, and heat-treated under flowing nitrogen by heating from ambient temperature to 750° C. in 1 hour, heating for 1 hour at 750° C., and cooling for about 6 hours in the furnace. The silica incorporation was 1.8 weight percent.

EXAMPLE NO. 10

A sol of tetrathoxysilane and methyltrimethoxysilane was employed to impregnate a graphite tube. The sol was applied under pressure in five treatments then etched and treated again under ambient pressure.

Part 10A

Sol 10A was identical to Sol 3A.

Part 10B

A graphite tube described hereinabove was treated with Sol 10A in the manner described in Example No. 2, Part 2B, except that the infiltration/drying/firing cycle was repeated a total of five times, yielding a silica incorporation of 6.7 weight percent.

The impregnated tube was then immersed in Sol 10A for 10 minutes at ambient temperature and pressure, dried for 10 minutes at 75° C. in a circulating air oven, heated from ambient temperature to 750° C. in 1 hour, and allowed to cool. The tube was then immersed in 10 percent methanolic potassium hydroxide for 10 minutes at ambient temperature, rinsed with methanol, and dried at 75° C. under a reduced pressure of approximately 100 mm Hg for 10 minutes. The coated, etched tube was then reimmersed in Sol 10A for 10 minutes at ambient temperature and pressure, and the drying and firing sequences were repeated. The silica incorporation of the coated and impregnated tube was about 7 weight percent.

EXAMPLE NO. 11

A sol of tetraethoxysilane, methyltrimethoxysilane and 3-amino-propyltriethoxysilane was employed to impregnate a graphite block. The sol was applied via electroinfiltration in one treatment.

Part 11A

A 500 ml 3-neck, round bottom flask was fitted with a reflux condenser, a thermometer, a magnetic spin bar, and a heating mantle. The flask was charged with 185.9 parts absolute ethanol, 47.4 parts TEOS, and 46.3 parts MTMS. In a separate vessel were placed 42.3 parts of water and 6.25 parts of 3-amino-propyltriethoxysilane (3-APTES). To this solution was added 12N hydrochloric acid until the solution pH was 1.8. The acidified 3-APTES solution was then added to the reaction flask, and the solution was heated to 60° C. over about 30 minutes. The system was stirred at 60° C. for 1 hour and allowed to cool to ambient temperature.

Part 11B

Sol 11A was charged to a stainless steel beaker, which was connected to the positive output of a D.C. power supply. A graphite block, approximately 37 mm×25.2 mm×6.9 mm and weighing 11.7322 g, was connected to the negative output of the D.C. power supply and was immersed in the sol. A constant potential of 10 v was applied for 30 minutes; the potential was then raised to 20 v for 30 minutes, and finally, to 30 v for 30 minutes. The sample was dried at 65° C. under a reduced pressure of about 100 mm Hg for 16 hours. The sample was then heated under a stream of nitrogen from ambient temperature to 750° C. in 1 hour, held for 1 hour at 750° C., and allowed to cool in the furnace for several hours. The graphite/silica composite weighed 11.9064 g, a weight gain of 0.1742 g or 1.5 percent. X-ray dot analysis showed that the silicon was evenly distributed across the cross-section of the sample.

EXAMPLE NO. 12

A sol of tetraethoxysilane, methyltrimethoxysilane and 3-amino-propyltriethoxysilane was employed to impregnate a graphite tube. The sol was applied via D.C. power in five treatments.

Part 12A

Two 207 ml crown cap bottles were each charged with a solution consisting of 75.3 parts absolute ethanol, 43.5 parts TEOS, and 55.8 parts MTMS. Solutions of 0.7 parts 3-APTES in 60 parts water was prepared, and the pH was adjusted to 2.0 by the addition of 12N hydrochloric acid. The 3-APTES solutions were added to the respective reaction bottles, which were then capped and agitated in a constant temperature bath at 61° C. for 1 hour. The sols were allowed to stand at the ambient room temperature overnight.

Part 12B

A 400 ml glass beaker was employed as the electrochemical cell. A graphite tube described hereinabove was connected to the negative output of the D.C. power supply and placed on end in the middle of the reaction cell. The counter electrode was a cylindrical platinum mesh about 67 mm in diameter by 125 mm long, placed in the cell so as to surround the graphite tube (working electrode). The cell was filled with Sol 12A, and a constant potential of 10 v was placed across the electrodes until the deposition current had declined from 249 ma to 6 ma, a period of 5 hours. The tube was then dried at 75° C. under a reduced pressure of about 100 mm Hg for 16 hours. The powdery coating on the surface of the tube was removed.

The tube was again placed in the reaction cell, arranged as above, and a potential of 10 v was applied until the current declined to 15 ma (5.5 hours). The potential was then increased to 20 v. When the current had declined to 15 ma (1 hour), the potential was increased to 30 v until the current had declined to 13 ma (1 hour). The tube was again dried at 75° C. under reduced pressure for 16 hours. The tube was then heated under a stream of nitrogen from the ambient room temperature to 750° C. in 1 hour, held for 1 hour at 750° C., and allowed to cool in the furnace for several hours. The silica incorporation was 1.1 weight percent.

The tube was again placed in the reaction cell, arranged as above, and a potential to 10 v was applied for 4 hours, followed by 20 v for 2 hours. The tube was again dried and fired, as described in the preceding paragraph. The total silica incorporation was 1.3 weight percent.

Because the sol was exhibiting a rapidly increasing viscosity at this point, a fresh sol was prepared. The tube was once again placed in the reaction cell, arranged as described previously, and a potential of 10 v was applied for 2.5 hours, followed by 20 v for 1 hour. The tube was dried, but not fired.

The tube was placed in the reaction cell once again, and a potential of 10 v was applied for 3.5 hours, followed by 20 v for 1.5 hours, and 30 v for 2 hours. The tube was dried and fired as previously described. The tube had a smooth glassy appearance, and the final silica incorporation was 1.6 weight percent.

EXAMPLE NO. 13

A sol of tri-s-butoxyaluminum was employed to impregnate a graphite tube. The sol was applied under pressure in one treatment.

Part 13A

Tri-s-butoxyaluminum 100 ml was combined with 700 ml distilled water and 5 ml concentrated nitric acid. The solution was boiled until the volume was reduced to 300 ml. The sol was cooled to ambient temperature, and 100 ml ethanol were added to form alumina Sol 13A.

Part 13B

A graphite tube was treated with Sol 13A in the manner described in Example No. 2, Part 2B. After drying and firing, the alumina incorporation was found to be 0.5 weight percent.

EXAMPLE NO. 14

A sol of tetraethoxytitanium was employed to impregnate a graphite tube. The sol was applied under pressure in two treatments.

Part 14A

A 500 ml 3-neck round bottom flask was fitted with a reflux condenser, a thermometer, an addition funnel, a magnetic spin bar and a heating mantle. The flask was charged with 971 parts absolute ethanol; 100 parts tetraethoxytitanium were added, and the vessel was rinsed with 121 parts absolute ethanol, which was added to the reaction flask. The solution was heated to 63° C.

The addition funnel was charged with 97.1 parts ethanol, 3.4 parts water and 1.0 part 1N hydrochloric acid. This solution was added dropwise with agitation over a period of 22 minutes. The solution was heated at 63° C. for an additional 38 minutes and allowed to cool to ambient temperature. The sol was further diluted by the addition of 655 parts of ethanol.

Part 14B

A graphite tube described hereinabove was sealed in a pressure reactor and subjected to a vacuum of about 660 mm Hg for 2 hours. Sol 14A was pressure-transferred into the reactor, and a pressure of 100 psig (0.69 MPa) was applied for 17 hours at ambient temperature. The tube was dried for 8 hours at 75° C. under a reduced pressure of about 100 mm Hg. The tube was then heated under a flowing nitrogen stream to 750° C. in 1 hour, held for 1 hour at 750° C. and allowed to cool in the furnace for approximately 6 hours. The titania incorporation was 0.13 weight percent.

Part 14C

A second titania sol was prepared, using the apparatus described in Part 14A. The reaction flask was charge with about 750 parts absolute ethanol and 100 parts tetraethoxytitanium. This solution was heated to 49.5° C.

The addition funnel was charged with about 120 parts ethanol, 3.9 parts water, and 0.5 part 1N hydrochloric acid. This solution was added dropwise to the reaction vessel over a period of 32 minutes. The sol was heated an additional 28 minutes at 49.5° C., and allowed to cool to ambient temperature.

The tube from Part 14B was sealed in a pressure vessel, and a vacuum of about 660 mm Hg was applied for 16 hours at ambient temperature. Sol 14C was pressure-transferred into the reactor, and a pressure of 100 psig (0.69 MPa) was applied for 8 hours. The tube was dried for about 64 hours at 75° C. under a reduced pressure of about 100 mm Hg. The tube was then heated under nitrogen to 750° C. in 1 hour, held for 1 hour at 750° C., and allowed to cool in the furnace for about 6 hours. An additional 0.245 g of titania were incorporated, for a total of 0.44 weight percent.

EXAMPLE NO. 15

A sol of tetraethoxysilane, methyltrimethoxysilane and tetraisopropoxytitanium was employed to impregnate a graphite tube. The sol was applied under pressure in three treatments.

Part 15A

The reaction apparatus as described in Example 14, Part 14A, was charged with 167 parts absolute ethanol, 37.3 parts TEOS, and 47.7 parts MTMS. The solution was heated to 55° C., and 8.8 parts water and 0.25 part 1N hydrochloric acid were added. The temperature rose to 63° C. The temperature was reduced to 60° C. and maintained at that point for 1 hour. The sol was then allowed to cool to the ambient room temperature, which required about 2 hours.

The addition funnel was charged with 15.0 parts tetraisopropoxytitanium and 41.8 parts ethanol. This solution was added to the reaction flask dropwise, with agitation, over a period of 30 minutes. The reaction mixture was stirred for 5 minutes and 24.7 parts water were added dropwise over a period of 52 minutes. The sol was then stirred for 90 minutes at ambient temperature.

Part 15B

A graphite tube described hereinabove was sealed in a pressure reactor, and vacuum of about 660 mm Hg was applied for about 16 hours. Sol 15A was pressure-transferred into the reactor, and a pressure of 100 psig (0.69 MPa) was applied for 7 hours. The tube was dried at 75° C. under a reduced pressure of about 100 mm Hg for 16 hours.

The tube was returned to the pressure reactor and the cycle was repeated, except that the treatment time was 8 hours. The tube was then dried, and heat-treated to 750° C. in 1 hours, held for 1 hour at 750° C., and allowed to cool in the furnace for several hours. At this point, the incorporation of the titania-silica was 1.45 weight percent.

A fresh sol was prepared by the process of Example No. 15, Part 15A, and then one additional infiltrating/drying/firing cycle was performed. The final titania-silica incorporation was 2.2 weight percent.

EXAMPLE NO. 16

A sol of tetraisopropoxytitanium and trimethylborate was employed to impregnate a graphite tube. The sol was applied under pressure in three treatments.

Part 16A

The reaction apparatus as described in Example No. 14, Part 14A, was charged with 474 parts ethanol and 56.9 parts tetraisopropoxytitanium. The solution was warmed to 42° C., and 56.9 parts ethanol, 0.57 part 1N hydrochloric acid, and 2.85 parts water were added dropwise, with agitation, over a period of 21 minutes. The sol was then stirred for 30 minutes at 41° to 43° C., and allowed to cool for 30 minutes to 28° C.

A solution composed of 43.1 parts trimethylborate and 38 parts ethanol was then added dropwise, with agitation, over a period of 33 minutes. The sol was stirred at ambient temperature for 2 hours.

A solution of 3.0 parts water and 0.38 part 1N hydrochloric acid in 114 parts ethanol was then added dropwise, with stirring, over a period of 80 minutes. The resulting suspension was stirred for 1 hour at ambient temperature, and allowed to stand for 16 hours. The pH was about 6.7. Therefore, 1.9 parts of 12N hydrochloric acid were added, reducing the pH to about 2.7 and resulting in the formation of a colloidal sol.

Part 16B

A graphite tube described hereinabove was sealed in a pressure reactor and subjected to a vacuum of about 660 mm Hg for 2 hours. Sol No. 16A was pressure-transferred into the reactor, and a pressure of 110 psig (0.76 MPa) was applied for about 4 hours. The tube was dried at 75° C. under a reduced pressure of about 100 mm Hg for 16 hours.

The impregnation/drying cycle was repeated two additional times. The tube was then heated under a stream of nitrogen from ambient temperature to 750° C. in 1 hour, heated for 1 hour at 750° C., heated from 750° to 1400° C. in 2 hours, heated for 1 hours at 1400° C., and allowed to cool in the furnace for several hours. The net weight increase of titania-boria was 0.5 weight percent.

As should now be evident from the foregoing examples, it is now possible with the process of the present invention to produce impervious graphite suitable for service temperatures in excess of 232° C. by the use of the sol gel technology disclosed herein and in copending U.S. Ser. No. 090,575. Graphite silica composites having up to 10 weight percent silica can be obtained by repeated cycles of impregnating porous graphite with a silica sol, removing the solvent to form a gel and heating to form an inorganic glass. Short sections of graphite heat exchanger tubes treated in this manner have successfully passed a pressure test of 40 psi (0.28 MPa).

Based upon the foregoing exemplification, it can be seen that the present invention provides graphite/glass and graphite/ceramic composites as well as a process for the preparation thereof. It is to be understood that the examples reported herein have been provided to present results obtainable by practice of the disclosed invention. Inasmuch as a wide variety of reactants have been disclosed to prepare the silica sols and impregnants of this invention, we do not intend to limit our invention to the specific examples provided herein. Furthermore, the process for preparing these graphite composites are believed by us to be operable with other reactants, solvents, infiltration techniques, temperatures, pressures and other conditions than those which have been exemplified herein. Thus, it should be evident that the determination of particular reactants, conditions and the like, as well as the amounts thereof, can be made without department from the spirit of the invention herein disclosed and described, and that the scope of the invention shall include all modifications and variations that fall within the scope of the attached claims.

We claim:

1. Graphite composite articles having low permeability comprising:
    a graphite structure formed from a porous graphite material; and
    a glass or ceramic layer bonded thereto derived from a hydrolyzed impregnant serving to fill the pores and coat the surface of said graphite structure, selected from the group consisting of alkoxides, alkyls, alkylalkoxides, halides and acetates of the elements of Groups IA through VIIA, Groups IB through VB, Group VIII and the rare earth elements, said hydrolyzable compound impregnant constituting a precursor of said glass or ceramic.

2. Graphite composite articles, as set forth in claim 1, wherein said hydrolyzable compounds include alkoxysilanes which comprise at least 50 percent by weight of said impregnant.

3. Graphite composite articles, as set forth in claim 2, wherein said graphite structure comprises a hollow tube.

4. Graphite composite articles, as set forth in claim 3, wherein said graphite structure comprises a heat exchanger and said hydrolyzable compound comprises tetraethoxysilane.

5. Graphite composite articles, as set forth in claim 4, comprising about 4 weight percent silica.

6. Graphite composite articles, as set forth in claim 3, wherein said graphite structure comprises a heat exchanger and said hydrolyzable compounds comprise tetraethoxysilane and methyltrimethoxysilane.

7. Graphite composite articles, as set forth in claim 6, comprising from about 2 to 12.6 weight percent silica.

8. Graphite composite articles, as set forth in claim 3, wherein said graphite structure comprises a heat exchanger and said hydrolyzable compound comprises methyltrimethoxysilane.

9. Graphite composite articles, as set forth in claim 8, comprising about 3.9 weight percent silica.

10. Graphite composite articles, as set forth in claim 3, wherein said graphite structure comprises a heat exchanger and said hydrolyzable compounds comprise tetraethoxysilane, methyltrimethoxysilane and 3-aminopropyltriethoxysilane.

11. Graphite composite articles, as set forth in claim 10, comprising about 1.5 weight percent silica.

12. Graphite composite articles, as set forth in claim 1, wherein said graphite structure comprises a hollow tube.

13. Graphite composite articles, as set forth in claim 1, wherein said graphite structure comprises a heat exchanger and said hydrolyzable compound comprises tri-s-butoxyaluminum.

14. Graphite composite articles, as set forth in claim 13, comprising about 0.5 weight percent alumina.

15. Graphite composite articles, as set forth in claim 12, wherein said graphite structure comprises a heat exchanger and said hydrolyzable compound comprises tetraethoxytitanium.

16. Graphite composite articles, as set forth in claim 15, comprising about 0.44 weight percent titania.

17. Graphite composite articles, as set forth in claim 12, wherein said graphite structure comprises a heat exchanger and said hydrolyzable compounds comprise tetraisopropoxytitanium and trimethylborate.

18. Graphite composite articles, as set forth in claim 17, comprising about 0.5 weight percent titania-boria.

* * * * *